Nov. 5, 1968  R. SMOLINSKI ET AL  3,408,770
RACING TIRE
Filed April 6, 1966

INVENTORS
ROBERT SMOLINSKI
ROLAND MAXSON

BY Gullen, Sloman, & Cantor

ATTORNEYS 3,408,770
RACING TIRE
Robert Smolinski, 28618 Boston, St. Clair Shores, Mich.
48081, and Roland Maxson, 26080 Ronald, Roseville,
Mich. 48066
Filed Apr. 6, 1966, Ser. No. 540,657
2 Claims. (Cl. 46—221)

ABSTRACT OF THE DISCLOSURE

A slot car racing tire comprises a resilient annulus of porous material such as neoprene sponge coated on its outer peripheral surface with a silicone rubber for increasing road surface traction. The silicone coating interlocks with the pores of the neoprene annulus to create a firm bond which will not peel off during the stress of use.

---

This invention relates to an improved racing tire for slot cars.

Slot car racing tires currently in use suffer from several disadvantages. The materials which offer the desired resilience have poor wear resistance. The more durable tires are too rigid, causing damaging shocks to the car and insufficient traction. These latter tires are generally molded to the wheel, and the entire assembly must be replaced when the tire becomes worn, resulting in additional expense.

Accordingly, it is an object of this invention to provide a slot car racing tire which is resilient and which has a high coefficient of friction.

It is a further object of this invention to provide a slot car racing tire which has high wear resistance, while providing resilience and a high coefficient of friction.

These and other objects of this invention will become apparent from the following description when considered in conjunction with the following drawings.

Figure 1:
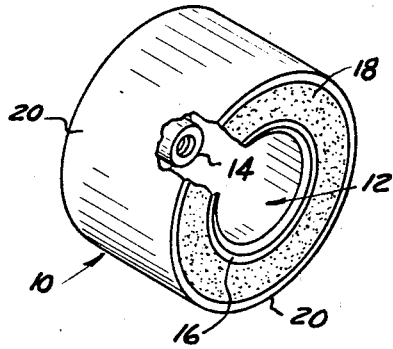
FIG. 1 is a perspective view of the improved tire of this invention mounted upon a wheel.
Figure 2:
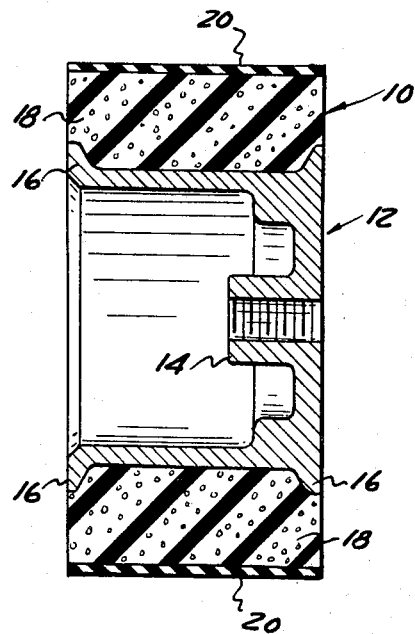
FIG. 2 is a cross-sectional elevation of the tire and wheel assembly of FIG. 1.

Referring now to FIGS. 1 and 2 of the drawings, there is illustrated an assembly which comprises tire 10 and wheel 12. Wheel 12 has a central hub 14 which is threaded to receive the threaded end of the car axle. Wheel 12 is further provided with retaining flanges 16 at the edges of the rim to assist in laterally anchoring the tire to the wheel.

Tire 10 comprises a cylindrical annular portion 18 which is fabricated of a resilient elastic material. One material which has been found to be extremely effective for this purpose is closed cell neoprene sponge having a very small cell size.

The dimensions of the tire may be from $5/16$ to $5/8$ of an inch wide, $3/4$ to $1\frac{1}{8}$ in outside diameter, and $1/4$ to $7/16$ in inside diameter. The tires may be cut to length from a piece of annular extruded sponge tubing, from which the skin on the outer circumference is removed by grinding.

The tread portion of the tire is provided with a coating 20 having an extremely high coefficient of friction with the racing track. The preferred coating material is a silicone rubber, such as the product of Dow Corning Corp., sold under the trademark Silastic. This is a flowable material which vulcanizes when exposed to air and which needs no heat for curing.

The coating is applied to the base sponge tire by diluting one part of Silastic with one part of naptha or heptane and applying it to the sponge tire with a brush. The coating is allowed to be absorbed into the sponge for approximately five minutes. Following this, a full strength or undiluted coat of Silastic is applied by brush to the tire and allowed to set for two to three hours. When this coating has set, a final undiluted coat is applied and allowed to set.

The initial surface penetration may be .010 to .030 inch thick, and the final undiluted coating will have a build-up of .010 to .030 inch.

This coating when cured forms a tough rubbery film which adheres tenaciously to the sponge due to the interlock established between the coating and the individual cavities or cells of the sponge. The small cell size improves the strength of the coating bond.

The improved tire of this invention offers several advantages over prior art tires. Other tire materials had poor wear resistance, and small chunks of material frequently were torn from the surface during operation. The coated tire of this invention eliminates the tearing problem and substantially prolongs tire life.

Generally, tires having comparable coefficients of friction are relatively non-elastic and are molded to the wheel. The entire wheel-tire assembly must be replaced when the tire becomes worn, since the tire cannot be removed from the wheel without destroying the tire. The coated tire of this invention, since it comprises a resilient and elastic sponge core, can be readily stretched into place over the rim of the rigid wheel, and it therefore can be purchased and assembled on a replacement basis by the car user. This represents a substantial cost saving for the customer.

By the same token, the older molded tires did not have the resilience afforded by the sponge base of this improved tire, and therefore were not capable of absorbing shocks resulting from joints or bumps in the track. Such bumps not only tended to vibrate and jar the racing car, with accompanying gradual loosening of parts, but also caused the car to bounce and lose traction.

The compressibility of this tire also permits greater tire contact area with the track. This is especially desirable during acceleration, when the dynamic weight transfer of the car causes a partial temporary flattening of the rear driving wheels, thereby enhancing traction and acceleration. A similar effect is produced during cornering. This increased tire contact area, in conjunction with high coefficient friction afforded by the coating, substantially improves the traction and therefore the performance of a car equipped with these improved tires.

Figure 3:
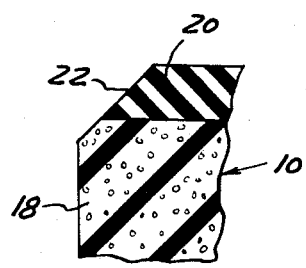
FIG. 3 is an enlarged, fragmentary, cross-section elevation of a modified form of tire.

To provide the desired drift or sideward slide in turns, the corners of the tire may be chamfered or sanded off if desired, as at 22 in FIG. 3. This operation, which can be easily done by the car owner to his own specifications, removes the high coefficient of friction coating from the area of the tire on which the car will be leaning in turns.

I claim:
1. A toy racing car tire for use on a smooth slippery track, comprising:
an annular core portion fabricated of a resilient material and having an inner diameter surface adapted to be slipped over and secured to a wheel hub and an outer diameter circumferential tread surface for engagement with the track;
and a thin coating of silicone rubber bonded to said outer tread surface of said annular core;
whereby said tread coating provides said tire with a high degree of wear resistance and traction.

2. The tire of claim 1 wherein said annular core is fabricated of a resilient cellular sponge rubber-like material;

whereby said core may be stretched over the outer circumference of a rigid wheel hub and thereafter retained thereon by the tension of the said elastic annulus, and whereby a firm interlocking bond is created between said silicon coating and the pores in the surface of said cellular core.

References Cited

UNITED STATES PATENTS

| 2,897,869 | 8/1959 | Polmanteer | 152—330 |
| 3,263,363 | 8/1966 | Doe | 46—221 |
| 3,022,810 | 2/1962 | Lambe. | |

LOUIS G. MANCENE, *Primary Examiner.*

C. R. WENTZEL, *Assistant Examiner.*